July 10, 1962 C. GRYCTKO ET AL 3,043,939
SEPARATE PHASE DIRECTED VENTING
Filed Nov. 13, 1958 3 Sheets-Sheet 3
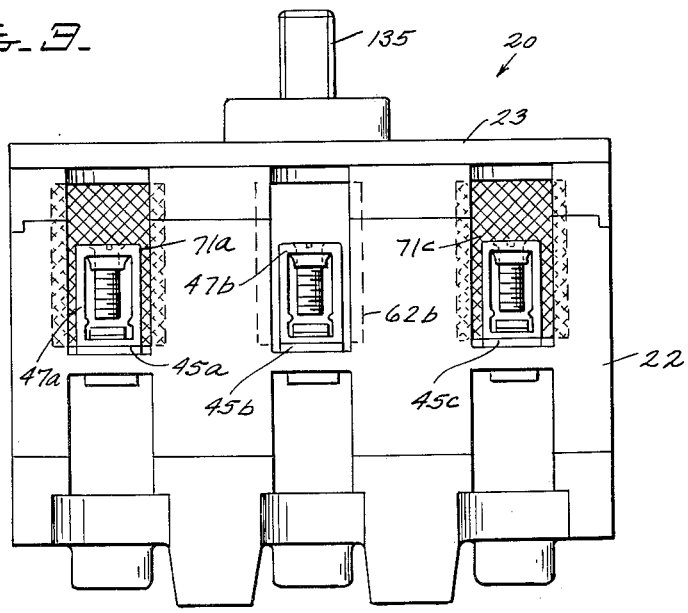
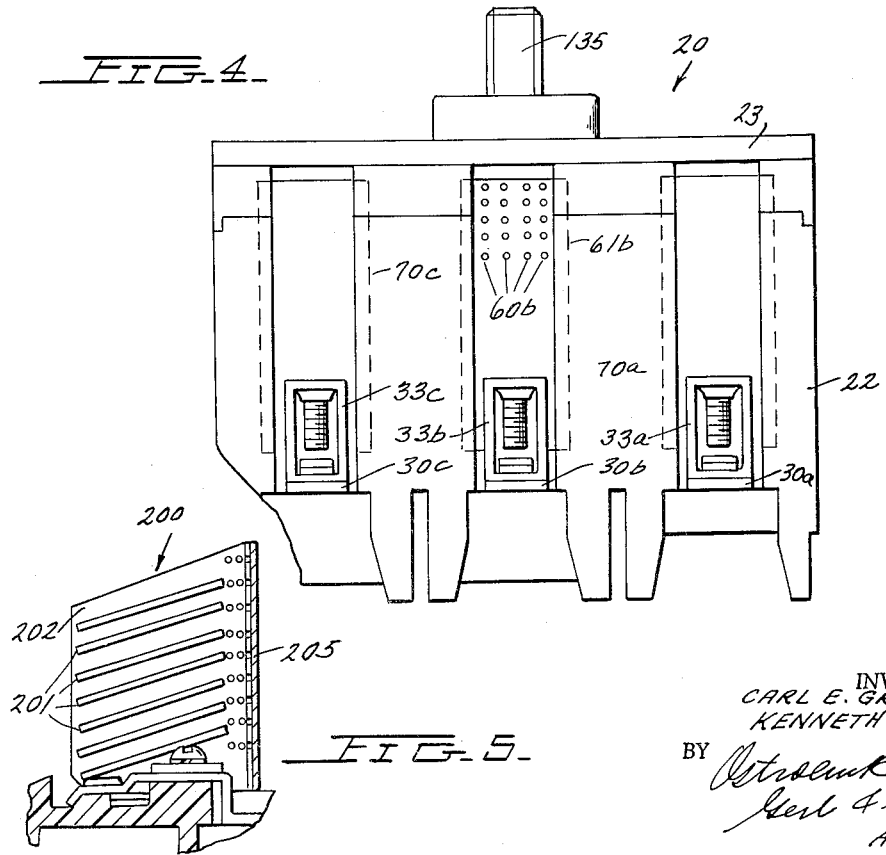
INVENTORS
CARL E. GRYCTKO
KENNETH D. BALL
BY
ATTORNEYS

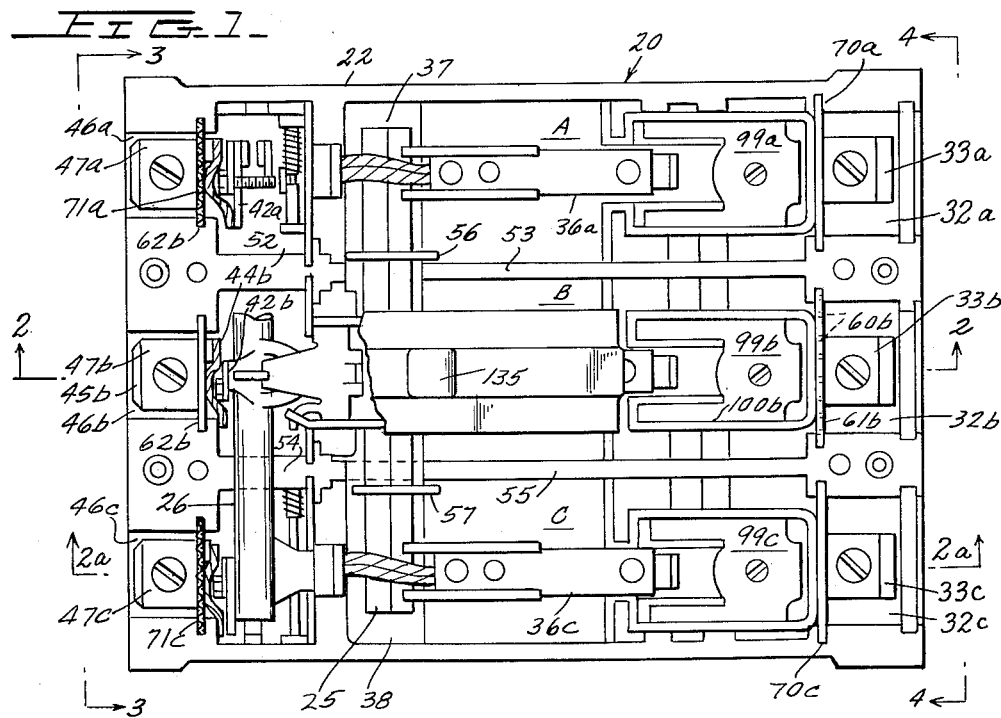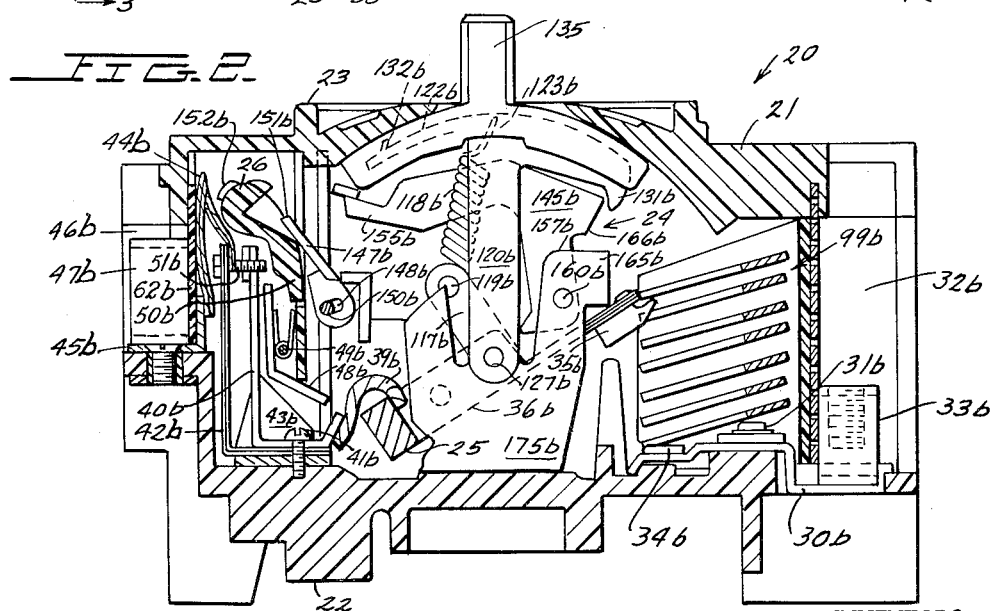

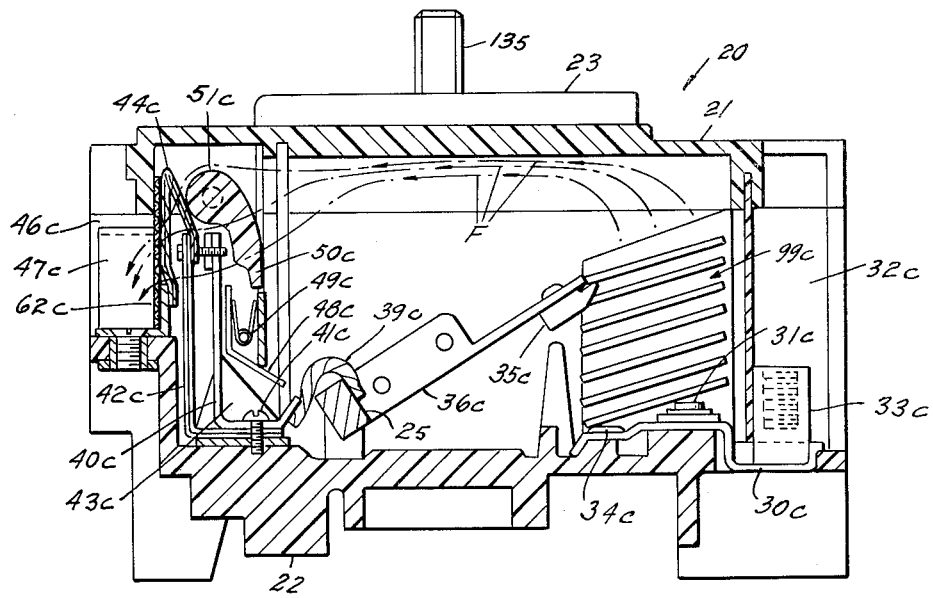

United States Patent Office 3,043,939
Patented July 10, 1962

3,043,939
SEPARATE PHASE DIRECTED VENTING
Carl Gryctko, Haddon Heights, N.J., and Kenneth D. Ball, Philadelphia, Pa., assignors to I-T-E Circuit Breaker Company, Philadelphia, Pa., a corporation of Pennsylvania
Filed Nov. 13, 1958, Ser. No. 773,634
1 Claim. (Cl. 200—144)

The instant invention generally relates to circuit breakers and more particularly to a novel arrangement for the venting of the arcing gases so as to prevent short circuits and flash-over from occurring externally of the circuit breaker case.

In multi-phase low voltage circuit breakers of the prior art it has been the practice to direct the gases of arcing formed during circuit interruption, in all phases of the circuit breaker, to one or the other ends of the circuit breaker case. That is, suitable internal case formations are provided to achieve isolation between the phases of the circuit breaker internally of the case and the gases of all phases are vented out of the same end of the case.

When the gases leave the case they are still, to a great extent, a in a highly ionized condition. If the gas from one phase mingles with the gas of a second phase before sufficient deionization has taken place a phase to phase flash-over will occur externally of the circuit breaker case.

In order to alleviate this condition, circuit breakers of the prior art have been constructed with elongated terminal chambers with the barriers forming the terminal chambers being constructed to provide elongated external phase to phase paths. In order to increase either or both the voltage or current rating of a circuit breaker without increasing the size of the case improved venting arrangements must be provided.

The instant invention provides improved venting by directing the arcing gases of adjacent phases, or poles, out of the case at opposite ends thereof. That is, the gases of a first phase are directed out of, say, the load end of the case while the gases produced in the phases adjacent to the first phase are directed out of the opposite or line side of the case. In this way, arcing gases produced in one phase must travel a long air path externally of the case in order to reach another phase of the circuit breaker.

In molded case circuit breakers of the type shown in U.S. Patent No. 2,421,853 the automatic trip units are usually located at the load side while arc extinguishing means for each of the phases are located at the line side. In a three phase circuit breaker the arc extinguishing means is usually positioned at the line side and, as shown in the instant application, since the arcing gases are most highly ionized in this region venting of the center phase mechanism is out of the line side while venting of the outside phases is out of the load side.

Venting may take place either through screened openings in the circuit breaker case or through a pressure relief means such as the type set forth in the William Harold Edmunds U.S. Patent No. 2,839,641, entitled "Arc Shield for Circuit Breaker Arc Quencher" and assigned to the assignee of the instant invention.

Accordingly, a primary object of the instant invention is to provide a novel construction for a circuit breaker which enables either or both the voltage and current rating to be increased without an increase in case size.

Another object is to provide improved venting means for molded case circuit breakers which will prevent phase to phase flash-over by increasing air clearance between phases externally of the case.

Still another object is to provide a circuit breaker wherein the venting of ionized gases produced in a first phase is directed out of one end of the breaker case while the gases produced in phases adjacent to the first phase are vented out of the other end of the case.

These as well as other objects of the instant invention shall become readily apparent after reading the following description of the accompanying drawings in which:

FIGURE 1 is a plan view of a three phase molded case circuit breaker with the cover removed.

FIGURE 2 is a longitudinal cross-section taken through line 2—2 of FIGURE 1 looking in the direction of arrows 2—2.

FIGURE 2a is a longitudinal cross-section taken through line 2a—2a of FIGURE 1 looking in the direction of arrows 2a—2a.

FIGURES 3 and 4 are end views of the circuit breaker, with the cover in place, looking in the direction of arrows 3—3 and 4—4, respectively, of FIGURE 1.

FIGURE 5 is a fragmentary view illustrating a pressure relief device for arc gas venting which may be incorporated in the circuit breaker of FIGURES 1–4.

Now referring to the figures, circuit breaker 20 is a three pole device constructed in accordance with the teachings of the instant invention. Circuit breaker 20 comprises a common case 21 for all three phases including a molded base 22 and a cooperating removable molded cover 23. A common bar 25 and common tripper bar 26 mechanically interconnect all three phases A–C so that a single operating mechanism 24 is effective to bring about simultaneous operation of all three phases A–C. Operating mechanism 24 may be of a conventional type, one of which is illustrated in the U.S. Patent to J. C. Brumfield entitled "Instantaneous Trip Circuit," and assigned to the assignee of the instant invention.

Since the specific pole units A–C and operating mechanism 24 do not, per se, comprise this invention, the description thereof will be rather brief. Further, for the sake of brevity only the center pole unit B shall be described it being understood that the two outside pole units A and C are of substantially identical construction.

Pole unit B comprises line strap 30b secured to base 22 by rivet means 31b. One end of strap 30b extends into end chamber 32b of case 22. Solderless line terminal connector 33b is secured to this end of strap 30b and is disposed within chamber 32b. Stationary contact 34b is secured to the other end of strap 30b.

Movable contact 35b, engageable with cooperating stationary contact 34b, is secured to one end of contact arm 36b while the other end of arm 36b is secured to common bar 25. The ends 37, 38 of bar 25 are entered into recesses in the side walls of base 22 to act as pivots for bar 25. Braid 39b extends from contact arm 36b to one end of bimetal protective shunt 40b which is secured by screw means 41b to base 22.

Screw means 41b also secures one end of bimetal 42b and magnet 43b to base 22. Braid 44b extends from the free end of bimetal 42b to load terminal member 45b which extends into chamber 46b at the load end of circuit breaker 20. Solderless line terminal connector 47b is disposed within chamber 46b and is mounted upon terminal member 45b.

Operating mechanism 24 is described in the aforesaid Patent 2,673,908 and comprises T-member 120b which is provided near the upper portion thereof with a substantially rectangular extension 131b. Upper T-member portion 122b is slotted and provided with a raised member 132b which serves to be engaged by plastic operating handle 135 for manually opening and closing circuit breaker 20. One leg 155b of V-shaped cradle 145b is shaped to engage latch 147b. Latch 147b is provided with a slot 148b engaged by pin 150b around which latch 147b can rotate and also have translational motion.

Latch 147b is also provided with a pointed end 151b latched, under normal conditions, by a latch surface 152b on tripper bar 26.

Latch surface 152b is composed of a thin strip of material on tripper bar 26 supporting latch 147b. Leg 157b of V-shaped member 145b is provided with a cylindrical hole engaged by pivot pin 160b secured to the raised portion 165b of frame 175b. Leg 157b of V-shaped member 145b is provided at the bottom of the V with a shoulder extension 166b. Raised portion 165b of frame 175b is provided with an opening through which contact arm 36b extends. Operating spring 118b is secured to handle 135b at 123b and to the pin 119b at the knee of the operating toggle only one link 117b of which is shown.

Automatic instantaneous tripping of circuit breaker 20 is effected when armature 48b is attracted by magnet 43b so as to be pivoted clockwise about pin 49b into engagement with the tripper bar extension 50b. This causes tripper bar 26 to rotate counterclockwise to free latch 147b. Automatic time delay tripping of circuit breaker 20 is effected when the free end of bimetal 42b has deflected to the right until calibrating screw 51b carried by bimetal 42b engages tripper bar extension 50b also causing a counterclockwise rotation of tripper bar 26.

Base 22 is provided with longitudinally extending formations 52, 53 which separate phases A and B and also with longitudinally extending formations 54, 55 which separate phases B and C. Similar internal formations of cover 23 cooperate with formations 52—55 to effect substantial isolation of phases A–C. Circular members 56, 57 secured to common bar 25 add to the isolation.

The term "isolation" as used herein refers to the measures taken to prevent the passage within the case from pole to pole of gases produced at the cooperating contacts during circuit. The term "substantial isolation" as used herein refers to the fact that the isolation will not be complete unless elaborate measures are taken. As a practical matter it is not necessary to resort to these elaborate measures since a small leakage between phases can be tolerated.

In the center pole B the line side chamber 32b communicates with the internal portion of case 21, wherein pole B is disposed by means of the perforations 60b of sheet 61b. The other end of pole B is closed off by solid member 62b. Thus, the arcing gases formed during the parting of cooperating contacts 34b, 35b will pass between the parallel plates of arc extinguisher 99b and the open right hand end of the frame 100b, through perforations 60b comprising the venting means for phase B.

In the two outside poles A and C, the line side chambers 32a, 32c are sealed off from poles A and C by solid members 70a, 70c, respectively. However, the load side chambers 46a, 46c of poles A and C, respectively, communicate with the poles A and C by means of wire mesh members 71a, 71c, respectively. Thus, the arcing gases of the outside poles A and C will be through venting means 71a, 71c at the load side of circuit breaker 20, probably taking a path indicated by lines F of FIGURE 2a. Perforated sheet 60b, wire mesh members 71a, and 71c and solid members 62b, 70a, 70b each have their vertical edges disposed within vertical slots of base 22 and cover 23.

With the circuit breaker construction hereinbefore described the vented arcing gases must travel a long air path externally of the case in order to reach another phase. It is readily seen that the external interphase spacing for the vented arcing gases from pole B to either of the adjacent poles A or C has been increased to the entire length of case 21. This is a material lengthening of the possible flash-over path.

FIGURE 5 illustrates a pressure relief type device which may be substituted for the arc gas venting means at either or both ends of circuit breaker 20. This device is of the type which is fully described in the aforesaid Patent 2,839,641. Briefly, arc extinguishing means 200 comprises a plurality of spaced plates 201 maintained in position by holder 202 which is generally U-shaped in horizontal section.

A flexible shield 205 is secured at its lower end by suitable means (not shown) and is positioned adjacent to the perforated web of holder 202 to form a wall of a line side terminal chamber.

When an arc is struck between the cooperating contacts associated with arc chute 200 the pressure of the arcing gases builds up until shield 205 deflects to the right thereby allowing the gases to vent through the frame perforations and thence over the top of shield 205. Thus, shield 205 performs as a pressure relief device.

While the vent openings have been illustrated as actually being in the ends of the circuit breaker case it is to be understood that the vent openings need only be in the region of the ends of the case. That is, the vent openings may actually be in the top or bottom surfaces of the case but adjacent to the ends of the case. Accordingly, the references in the claim to ends of the case are not to be construed as being limited to the end surfaces of the case.

Although we have here described preferred embodiment of our novel invention, many variations and modifications will now be apparent to those skilled in the art, and we therefore prefer to be limited, not by the specific disclosure herein but only by the appending claim.

We claim:

A multiphase circuit breaker including a first, a second, and a third pole and a case wherein all of said poles are disposed; said poles being arranged in parallel relationship extending between a first and a second end of said case with said second pole being positioned between said first and said third poles; said case having internal formations operatively positioned to substantially isolate said poles from each other; said second end being substantially closed in the regions of said first and said third poles; said first end being closed in the region of said second pole; means, positioned at said first end, constructed for venting arcing gases of said first and said third poles externally of said case; means, positioned at said second end, constructed for venting arcing gases of said second pole externally of said case; each of said phases including a pair of cooperating contacts and an arc extinguishing means positioned within said case adjacent to said second end; each of said phases also including an automatic trip means positioned within said case adjacent to said first end.

References Cited in the file of this patent

UNITED STATES PATENTS

| | | |
|---|---|---|
| 2,643,314 | Ridgley | June 23, 1953 |
| 2,678,359 | Brumfield | May 11, 1954 |
| 2,710,897 | Lindell | June 14, 1955 |
| 2,719,203 | Gelzheiser et al. | Sept. 27, 1955 |
| 2,839,641 | Edmunds | June 17, 1958 |